United States Patent [19]
Uchida et al.

[11] 4,040,666
[45] Aug. 9, 1977

[54] APPARATUS AND METHOD OF SHIELD EXCAVATION

[75] Inventors: Yoshiaki Uchida, Ichikawa; Kazuhiko Ishiwata, Tokyo, both of Japan

[73] Assignee: Tekken Kensetu Co. Ltd., Tokyo, Japan

[21] Appl. No.: 687,200

[22] Filed: May 17, 1976

[30] Foreign Application Priority Data

Oct. 13, 1975  Japan .................. 50-122534

[51] Int. Cl.$^2$ .................. E21D 9/04; E21D 9/12
[52] U.S. Cl. .................. 299/1; 61/84; 73/155; 175/48; 299/18
[58] Field of Search .................. 299/1, 11, 18; 175/38, 175/48, 62; 61/42, 84, 85; 302/3, 14

[56] References Cited
U.S. PATENT DOCUMENTS

| | | | |
|---|---|---|---|
| 3,552,502 | 1/1971 | Wilson | 175/38 X |
| 3,778,107 | 12/1973 | Haspert | 299/11 |
| 3,830,545 | 8/1974 | Sugden | 175/62 X |

Primary Examiner—Ernest R. Purser
Attorney, Agent, or Firm—Pierce, Scheffler & Parker

[57] ABSTRACT

An apparatus and method for excavating tunnels with a shield and slurry while detecting and preventing excess excavation in high water content soft ground wherein, in each of feeding system of slurry to tunnel face and discharging system of a mixture of slurry and excavated soil or the like as well as gushing water from the tunnel face out of working area, the respective volumes of the slurry and mixture passing through the respective systems are measured in positions close to the tunnel face, the volume of the excavated soil or the like is determined with the difference between both volumes while the amount of propelling a tunnelling machine is determined as an excavated space volume of the tunnel, the respective values of the excavated soil volume and excavated space volume are compared with each other, whereby the amount of propelling the machine, fed amount of the slurry or discharging amount of the mixture can be properly adjusted so that the difference between said values will be made substantially zero.

6 Claims, 5 Drawing Figures

APPARATUS AND METHOD OF SHIELD EXCAVATION

This invention relates to apparatuses and methods for hydraulically excavating tunnels of a shield type and, more particularly, to an improved apparatus and method for safely and efficiently making tunnels in a soft ground containing much water by using a shield type tunnelling machine or excavator with pressurized slurry.

There has been already suggested a technique wherein, in the apparatus and method of the kind referred to, the respective densities of solid bodies contained in the slurry and of a mixture of the solid bodies and excavated soil, sand, gravel and the like or their mixture forming the ground (which shall be referred to as "soil or the like" hereinafter) and added to the slurry, as well as the respective total flowing amounts of the fed slurry and of the mixture are measured in each of a feeding system of a slurry to the shield type excavator and a discharging system of the soil or the like excavated by the excavator together with the slurry out of working area, whereby the amount of actually excavated soil or the like is determined from the value of the difference in the amounts of only the solid bodies and soil or the like flowing through the respective systems, that is, the so-called dry-soil amounts so as to accurately perform a necessary advancing drive of the excavator on the basis of the value of the actually excavated amount and to accomplish a remote control of the entire apparatus from outside the tunnel. While this technique is advantageous when employed in the case where the nature of the soil forming the ground varies into several kinds within the working range, it is necessary to obtain an average density of the soils of the respective natures by a preliminary trial boring or the like performed over the entire working range and compare varying densities obtained at excavating points during the working with the average density in order to elevate the accuracy of the measurement. Therefore, the process is rather complicated and, on the other hand, in case the nature of the soil in the working range is substantially constant and thus sequential measurements of the soil densities are unnecessary, such complicated system will be rather improper. Further, in the case of using, for example, a gamma-ray densimeter to measure the densities, it will be required to install such densimeter on the gound surface outside the tunnel in order to achieve a safety from radioactive substance therein, so that a time lag must be caused to occur in the density measurement until the density of the soil is actually measured by the densimeter after the soil is added to the discharging system at the tunnel face and thus accurate successive measurements are prevented and, if the determined excavator propelling amount becomes different from the actually required value, there will be a danger of internal ground collapse, that is, an excess excavation of the soft ground at the tunnel face. The present invention has been suggested to eliminate such defects of the conventional technique and to provide an improved apparatus and method of the kind referred to, which are useful particularly for a ground having a less variation of the nature of the soil.

According to the present invention, in the shield type tunnel excavation in a ground having less variation in the nature of the soil, the feeding system and discharging system are provided respectively with a flow-meter at a position adjacent the tunnel face without using the gamma-ray densimeter and the difference between the respective measured values of the flow meters of both systems is operated so that the volume of the excavated soil or the like can be successfully calculated without substantially causing any time delay and, further, the advancing distance of the shield type tunnelling machine or excavator is detected and multiplied by the cross-sectional area of the shield tunnel face to determine the volume of propelling the tunnelling machine so that any excess excavation or ground collapse (which shall be referred to hereinafter simply as "excess excavation") at the tunnel face can be successfully promptly discovered at the early stage.

A primary object of the present invention is to provide an apparatus and method for hydralically excavating tunnels of a shield type whereinthe volume of the excavated soil can be calculated with little time delay.

Another object of the present invention is to provide an apparatus and method for hydraulically excavating tunnels of a shield type wherein any excess excavation at the tunnel face can be discovered promptly.

The present invention shall be detailed with reference to an apparatus in a preferred embodiment as illustrated in the drawings, in which.

Figure 1:
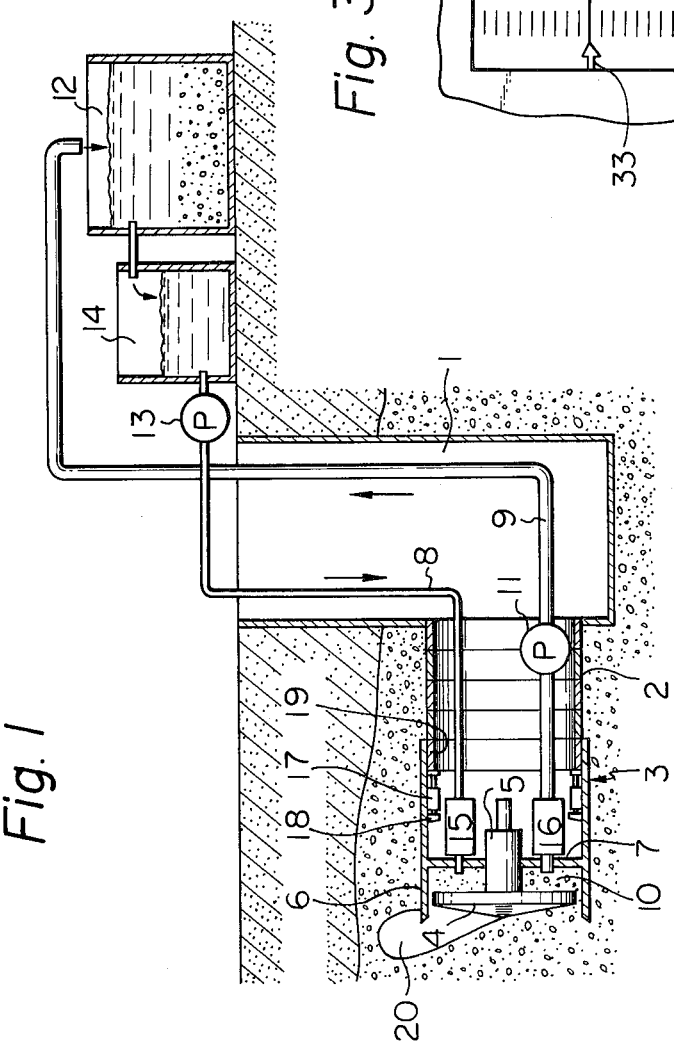
FIG. 1 is a sectioned view schematically showing an apparatus and method for hydraulically boring tunnels of a shield type according to the present invention.

In FIG. 1, there is shown an example of an excavation of a tunnel in a high water content soft ground below a flat ground surface, in which a shield tunnelling machine or excavator 3 is first set in a vertical shaft 1 provided at the starting point of the tunnel, a horizontal tunnel 2 is thereby excavated. A substantially disk-shaped rotary cutter head 4 is rotatably provided on a partition wall 7 of a substantially cylindrical tunnelling machine body 6 as born at a rotary shaft 5, in front end of the machine 3. While driving means for the cutter head 4 is not illustrated, any desired known driving means may be employed as installed within the machine 3. A hydraulic chamber 10 for a slurry is provided by the partition wall 7 behind the cutter head 4 so that the slurry will be fed into the hydraulic chamber 10 by a feeding pipe 8 through the partition wall 7 and the slurry under a pressure will be fed to the tunnel face through the rotary cutter head 4. The pressure of the slurry should be high enough to cause no natural collapse of the high water content soft ground on the tunnel face. The soil or the like excavated with the cutter head 4 is introduced into the hydraulic chamber 10 through the cutter head 4 together with a mixture of the fed slurry and muddy water or sludge of the ground and the whole is sequentially discharged into a soil separating tank 12 set on the ground surface by means of a pump 11 through a discharging pipe 9 opened in the hydrauylic chamber 10 through the partition wall 7. The mixture separated from the soil in the separating tank 12 is usually fed into a slurry tank 14 so as to be utilized again as a slurry and is fed into the hydraulic chamber 10 under a pressure by means of a pump 13 through the feeding pipe 8 connected to said tank 14. The feeding pipe 8 and discharging pipe 9 are provided respectively with such a flow meter as, for example, electromagnetic flow meter 15 or 16 at a position in close proximity to the tunnel face, that is, close to the partition wall 7. An oil pressure jack 17 is fitted on the cylinder side to a projection 18 inside the excavator body 6 so that an end of its plunger will abut against front end edge surface on the tunnel face side of the inner most one of segments 19 fixed to the peripheral wall of the excavated tunnel and is payed out in response to the progress of the tunnelling excavation to propel the tunnelling machine 3. In the drawing, the reference numeral 20 indicated a natural collapse part of a soft ground caused due to a lack of the amount of propelling the tunnelling machine 3 and sequential reduction of the hydraulic pressure on the tunnel face, that is, an excess excavation to be prevented by the present invention for avoiding any ground sinking readily occuring due to such collapse in the soft ground.

Figure 2:
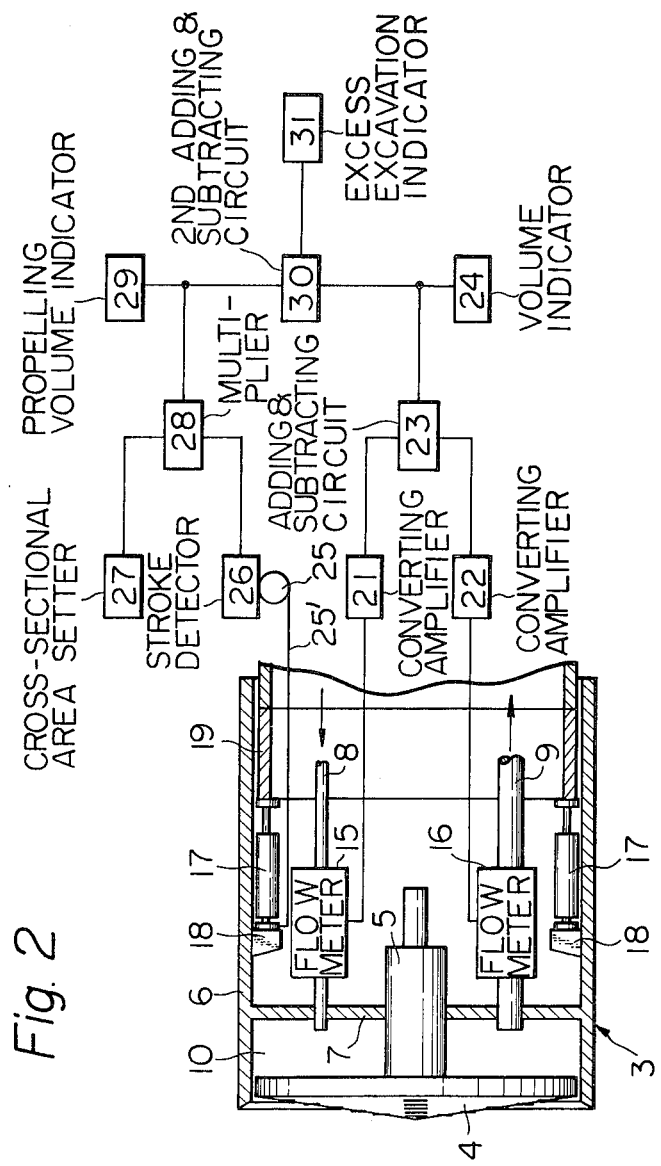
FIG. 2 is a circuit block diagram as associated with an excavator in the apparatus of FIG. 1 of a measuring device for determining the difference between the volume of the soil or the like excavated by the excavator and the volume of propelling the excavator.

In FIG. 2 showing an exemplary measuring device used in conjunction with the shield tunnelling machine of FIG. 1 according to the present invention, an output signal indicating the flowing amount of the fed slurry from the flow meter 15 provided in the slurry feeding pipe 8 and an output signal indicating the flowing amount of the fluid mixture of the slurry, soil or the like and sludge from the flow meter 16 provided in the discharging pipe 9 are once converted to alternating current signals and amplified respectively by converting amplifiers 21 and 22, amplified signals are then again converted to direct current signals and are given to an adding and subtracting circuit 23 to calculate the difference between both signals. The slurry is fed by a proper rotation of the pump 13 so that the pressure within the hydraulic chamber 10 will be kept at a value substantially balancing with the hydraulic pressure of the water-containing ground during the tunnelling period but, as the soil or the like and sludge excavated by the rotating cutter head 4 are led into the hydraulic chamber 10, the fluid mixture of the slurry, soil or the like and sludge must be discharged out of the chamber so that the pressure of the hydraulic chamber will not be increased by the added soil and sludge and a smooth progress of the tunnelling excavation will be maintained. Therefore, the flowing amount value of the discharging pipe 9 will be larger that the flowing amount value of the feeding pipe 8 and the difference between both values will be substantially equal to the amount or volume of the excavated soil or the like. This value is then given to a volume indicator 24 from the adding and subtracting circuit 23 and is indicated as the volume of the excavation performed. On the other hand, in order to know a propelled amount of the tunnelling machine 3, the variation of the stroke of the oil pressure jack 17 is detected as follows. that is, a cable 25' wound on a reel 25 is connected at one end to the projection 18 fixed to the machine body 6 and the length of the cable 25' payed out of the reel 25 in response to the propelling distance of the projection 18 together with the machine body 6 is detected by having a stroke detector 26 operated by, in the present instance, rotations of the reel 25. For the stroke detector 26, a synchronous generator which provides an output signal of a level corresponding to rotation amount of the reel 25 may be employed. There is provided a cross-sectional area setter 27 to which the value of the cross-sectional area of the shield tunnelling machine 3 is given in advance, and an output signal of this setter 27 and the output signal from the stroke detector 26 are given to a multiplier 28 and a propelling amount of the tunnelling machine 3 is obtained as a propelling volume by the product of both output signals. While this value is indicated by a tunnelling machine's propelling volume indicator 29, any difference between the respective values of the excavated soil volume indicator 24 and machine's propelling volume indicator 29 is determined by a second adding and subtracting circuit 30 and resultant value is indicated by an excess excavation indicator 31.

The above relations may be elucidated as follows using formulas:

If $Q_1$ represents a volume (in $m^3$) of the slurry flowing through the feeding pipe and $Q_2$ represents a volume (in $m^3$) of the mixture of the slurry and excavated soil or the like flowing through the discharging pipe, the volume of the excavated soil or the like will be $Q_2 - Q_1$. On the other hand, if A represents a cross-sectional area (in $m^2$) of the shield tunnelling machine and S represents a stroke (in m) of the oil pressure jack, the the machine's propelling volume will be $A \times S$. In the normal state with no excess excavation on the tunnel face, $$A \times S = Q_2 - Q_1 \qquad (a)$$

but in the case when an excess excavation occurs, such a phenomenon as represented by the following formula will occur instantaneously:

$$Q_2 - Q_1 > A \times S \qquad (b)$$

Figure 3:
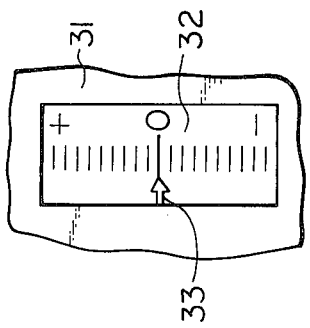
FIG. 3 is a view schematically showing an example of excess excavation indicating means in the measuring device of FIG. 2.

An embodiment of the indicating manner in the excess excavation indicator 31 is shown in FIG. 3. In this case, the indicator 31 is provided with a scale 32 having plus and minus graduations and a pointer 33 so that, when an excess excavation occurs, the pointer will move in the plus direction.

In case an excess excavation begins to occur, the pressure in the hydraulic chamber 10 will reduce since tunnel face cavity with which the chamber 10 is communicated through the cutter head 4 is momentarily increased, so that the phenomenon represented by the above formula (b) will appear in the indicator 31. While this phenomenon is invisible to any workers directly, he will notice it with such sudden change on the indicator and thus the slurry feeding amount of the pump 13 is increased to elevate the pressure of the hydraulic chamber 10 or the propelling amount of the oil pressure jack is increased to reduce the distance between the tunnel face and the cutter head, and the pointer 33 of the indicator 31 will begin to return to zero. On the contrary, when the pointer indicates a minus, discharging amount of the pump 11 is increased, and the pointer will begin to return to zero.

Further, it may be possible that, as a part of the slurry fed through the feeding pipe leaks on the way, the amount of the mixture fluid discharged through the discharging pipe may somewhat reduce or, on the contrary, when much water gushes out of the ground, the discharged amount of the mixture fluid may be larger than the fed amount of the slurry. In such case, a ratio setter to which a standard slurry feeding value or mixture fluid discharging value set on the basis of a designed value is given in advance may be inserted between the converting amplifier 21 or 22 and the adding and subtracting circuit 23 so that the output value of either of the flow meters may be corrected with such set value.

When an excess excavation occurs, not only the pointer of the excess excavation indicator 31 but also the pointers of the respective volume indicators 24 and 29 will fluctuate and therefore it will be desirable to judge the state of any excess excavation by observing the fluctuation of the pointer of such indicator 24 or 29 as well as that of the excess excavation indicator 31.

Figure 4:
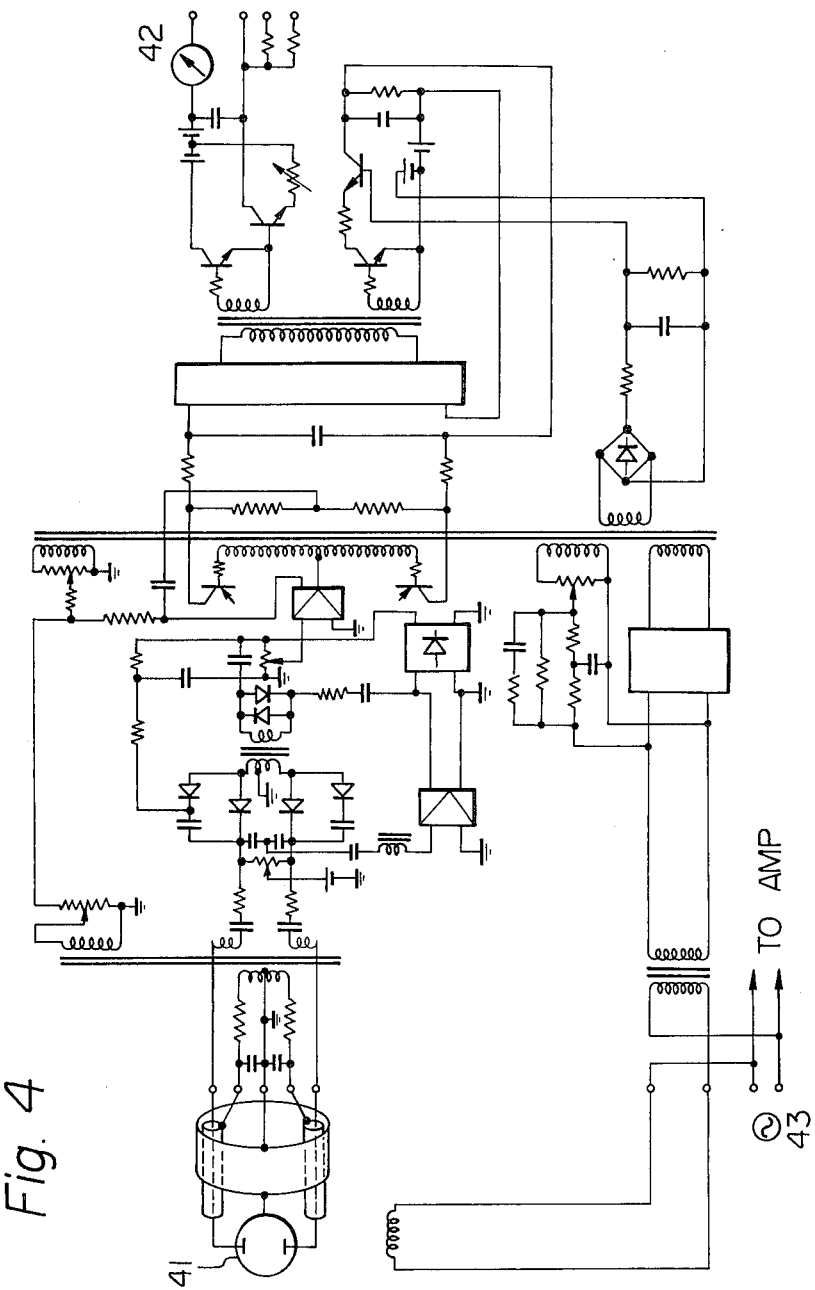
FIG. 4 is a circuit diagram of an electromagnetic flow meter as an example of the flow meter used in the measuring device of FIG. 2.

Referring briefly to FIG. 4 showing an example of the electromagnetic flow meter most preferable as the flow meter used in the present invention, a reference 41 indicates a detecting part, 42 indicates an output terminal and 13 indicates a current source terminal. The feeding pipe or discharging pipe is placed within an alternating current magnetic field in the detecting part 41 and an electromotive force obtained in proportion to the flowing velocity of the slurry or mixture fluid passing through the pipe is amplified to be an alternating current signal proportional to the electromotive force through a differential input feedback amplifying circuit. This alternating current signal is synchronously rectified in the same phase as of the magnetic flux density in a phase sensitive circuit and divided by the magnetic flux density in a dividing circuit, and the electromotive force representing the flowing amount is presented to the output terminal 42 as a direct current signal proportional to the flowing amount of the slurry or mixture fluid, irrespective of the magnetic flux density.

Figure 5:
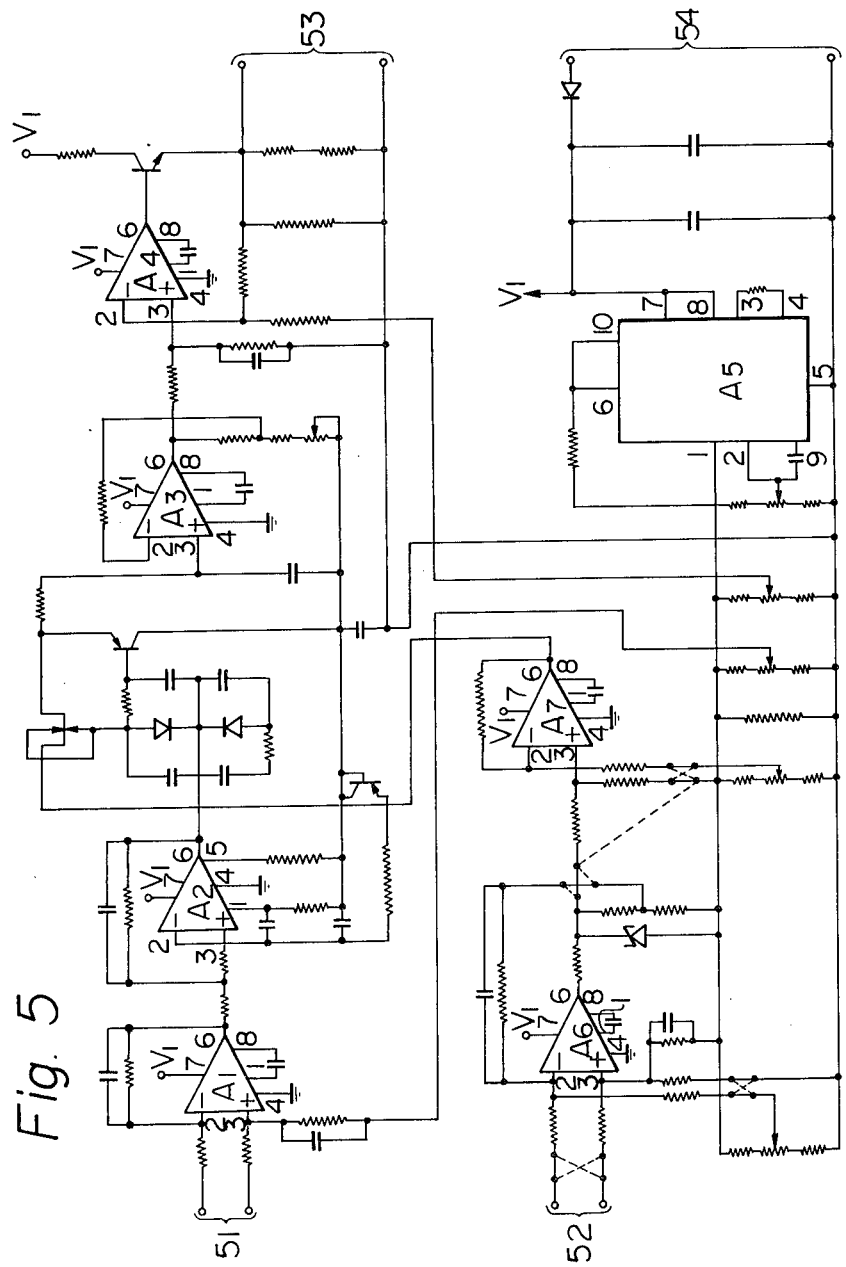
FIG. 5 is a circuit diagram showing an example of an adding and subtracting circuit used in the measuring apparatus of FIG. 2.

Referring next briefly to an example of the adding and subtracting circuit used in the present invention with reference to FIG. 5, the output from the tunnelling machine's cross-sectional area setter 27 in FIG. 2 is given to input terminals 51 and the output from the machine's propelling stroke detector 26 is given to the other input terminal 52. An output from output terminals 53 is given to the machine's propelling volume indicator 29 in FIG. 2. A source current for this adding and subtracting circuit is given to terminals 54.

While the flow meter and adding and subtracting circuit have been referred to with reference to the particular examples as illustrated, it will be understood that they are not limited to such examples, but any other known ones giving the same results can be used.

The features of the present invention are that the volume of the excavated soil or the like can be obtained on the basis of a value measured with flow meters disposed at a close position to the tunnel face so that the measurements can be performed without causing any time delay, therby any occurrence of dangerous excess excavation can be discovered promptly and, thus, there can be brought about such effects that the progress of any excess excavation during the tunnelling work can be well prevented and proper emergency measures against possible ground sinking due to the excess excavation can be immediately taken.

What is claimed is:

1. An apparatus for detecting at an early stage any fluctuation in solid body amount passing through a fluid path comprising in combination,
   a feeding system and discharging system forming said fluid path,
   a means for adding solid bodies to said fluid path at a position between respective said feeding and discharging system, said solid body adding means being movable and including means for detecting movements of the solid body adding means,
   a first measuring means for measuring flowing amount of a fluid passing through said feeding system at a position in close proximity to said solid body adding means,
   a second measuring means for measuring flowing amount of a fluid containing said solid bodies added and passing through said discharging system at position in close proximity to the solid body adding means,
   a means for detecting an amount of said solid bodies added by the adding means, said detecting means being connected with said first and second flow measuring means for comparing measured values of respective flowing amounts of both of said systems, and
   a means for determining any difference between detected values of both detecting means so as to make the added solid body amount substantially constant by adjusting the movement of the solid body adding means in response to output value of said determining means.

2. A shield tunnel boring apparatus of an excess excavation preventing type comprising in combination,
   a movable soil excavating means having a rotary excavating member capable of passing therethrough fluid and soil or the like and disposed at one end surface and a means for defining a substantially sealed space behind said excavating member on the other end surface side,
   a fluid feeding system feeding a fluid into said sealed space of said excavating means,
   a mixture fluid discharging system discharging a mixture fluid of said fluid and soil or the like excavated out of the sealed space,
   a first measuring means for measuring flow volumes of said fluid passing through said feeding system as connected with the feeding system at a position in close proximity to the excavating means of the feeding system,
   a second measuring means for measuring flow volumes of said mixture fluid passing through said discharging system as connected with the discharging system at a position in close proximity to the excavating means of the discharging system,
   a means for detecting volumes of the soil or the like excavated depending on any difference between respective measured volumes of the fed fluid and discharged mixture fluid as connected with said first and second measuring means,
   a means for detecting moved volume of the excavating means in response to movements of the excavating means as connected with the same and
   a means for indicating any difference between respective detected values of said excavated soil volume detecting means and of said excavating means moved detecting means as connected with both means.

3. The apparatus according to claim 2 wherein said excavating means moved volume detecting means comprises a means for detecting moving distance of the excavating means and a multiplier for determining a product of the output value of said moving distance detecting means and a value of excavating cross-section given in advance.

4. The apparatus according to claim 2 which further comprises a means for correcting measured values of said flow volume measuring means with a standard flow volume preliminary given, said correcting means being provided between said excavated soil volume detecting means and at least one of said first and second flow volume measuring means.

5. A method of measuring fluctuations in solid body amount added to a fluid path between a feeding system and discharging system of said fluid path, comprising steps of:
 measuring flowing amount of a fluid passing through said feeding system at a position in close proximity to adding point of the solid body,
 measuring flowing amount of a mixture fluid of said fluid and added solid body passing through said discharging system at a position in close proximity to said solid body adding point, and
 comparing respective measured values obtained in said respective steps and determining any difference between them.

6. An excess excavation preventing type tunnelling method with a shield type tunnelling machine and a pressurized slurry in a high water content ground, which comprises the steps of:
 propelling said tunnelling machine into said ground while feeding and discharging said slurry to and from the tunnel face,
 measuring volumes of said slurry passing through a feeding system for feeding the slurry to said tunnel face at a position in close proximity to the tunnel face,
 measuring volumes of a mixture fluid of soil or the like excavated by the tunnelling machine, gushing water and slurry passing through a discharging system discharging said mixture out of a working area at a position in close proximity to the tunnel face,
 comparing respective measured values obtained in said respective measuring steps to determine excavated ground volume with differences between them,
 measuring propelled volume of the tunnelling machine,
 determining any difference between said excavated ground volume and said propelled volume, and
 adjusting at least one of tunnelling machine propelling amount, slurry feeding amount and mixture fluid discharging amount in response to said volume difference value obtained in said volume difference determining step to render the volume difference value substantially to be zero.

* * * * *

UNITED STATES PATENT OFFICE
CERTIFICATE OF CORRECTION

PATENT NO. : 4,040,666
DATED : August 9, 1977
INVENTOR(S) : YOSHIAKI UCHIDA, et al It is certified that error appears in the above-identified patent and that said Letters Patent are hereby corrected as shown below:

Claim 2 - next to last line "volume" should appear before

"detecting".

Signed and Sealed this

Eighth Day of November 1977

[SEAL]

Attest:

RUTH C. MASON
Attesting Officer

LUTRELLE F. PARKER
Acting Commissioner of Patents and Trademarks